(12) United States Patent
Ma

(10) Patent No.: US 8,015,005 B2
(45) Date of Patent: *Sep. 6, 2011

(54) METHOD AND APPARATUS FOR VOICE SEARCHING FOR STORED CONTENT USING UNITERM DISCOVERY

(75) Inventor: Changxue Ma, Barrington, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 867 days.

This patent is subject to a terminal disclaimer.

(21) Appl. No.: 12/032,258

(22) Filed: Feb. 15, 2008

(65) Prior Publication Data

US 2009/0210226 A1 Aug. 20, 2009

(51) Int. Cl.
*G10L 15/00* (2006.01)
(52) U.S. Cl. .................. 704/236; 704/243; 704/244
(58) Field of Classification Search .................. 704/253, 704/254, 249, 231, 270, 270.1, 235, 243, 704/244, 236, 257; 707/708
See application file for complete search history.

(56) References Cited

U.S. PATENT DOCUMENTS

| | | | | |
|---|---|---|---|---|
| 7,181,398 B2 * | 2/2007 | Thong et al. | ........... | 704/254 |
| 7,257,533 B2 * | 8/2007 | Charlesworth et al. | ....... | 704/249 |
| 7,337,116 B2 * | 2/2008 | Charlesworth et al. | ....... | 704/254 |
| 7,725,319 B2 * | 5/2010 | Aronowitz | ............... | 704/253 |
| 7,849,070 B2 * | 12/2010 | Fassett et al. | .............. | 707/708 |
| 2005/0010412 A1 | 1/2005 | Aronowitz | | |
| 2006/0264209 A1 | 11/2006 | Atkinson et al. | | |
| 2007/0061420 A1 | 3/2007 | Basner | | |
| 2007/0106509 A1 | 5/2007 | Acero et al. | | |
| 2007/0198511 A1 | 8/2007 | Kim et al. | | |
| 2009/0164218 A1 | 6/2009 | Ma | | |

OTHER PUBLICATIONS

Feipeng Li and Changxue Ma, "Langauge Independent Voice Indexing and Search," Prepared and submitted for Proceedings of the 30th Annual International ACM SIGIR 2007 Conference on Research and Development in Information Retrieval, not accepted for the conference.

Sung Yun Jung, "PCT International Search Report and Written Opinion," WIPO, ISA/KR, Korean Intellectual Property Office, Daejeon, Republic of Korea, Jul. 28, 2009.

* cited by examiner

*Primary Examiner* — Huyen X. Vo

(57) ABSTRACT

A method, system and communication device for enabling voice-to-voice searching and ordered content retrieval via audio tags assigned to individual content, which tags generate uniterms that are matched against components of a voice query. The method includes storing content and tagging at least one of the content with an audio tag. The method further includes receiving a voice query to retrieve content stored on the device. When the voice query is received, the method completes a voice-to-voice search utilizing uniterms of the audio tag, scored against the phoneme latent lattice model generated by the voice query to identify matching terms within the audio tags and corresponding stored content. The retrieved content(s) associated with the identified audio tags having uniterms that score within the phoneme lattice model are outputted in an order corresponding to an order in which the uniterms are structured within the voice query.

14 Claims, 7 Drawing Sheets

METHOD AND APPARATUS FOR VOICE SEARCHING FOR STORED CONTENT USING UNITERM DISCOVERY

RELATED APPLICATION

The present application is related to the subject matter of co-pending U.S. patent application Ser. No. 11/962,866 entitled, "Method And Apparatus for Uniterm Discovery and Voice-to-Voice Search on Mobile Device," filed on Dec. 21, 2007. The subject matter of the related application is hereby incorporated herein by reference.

BACKGROUND

1. Technical Field

The present invention generally relates to communication devices and in particular to mechanisms and methodology for performing content search by voice query on communication devices.

2. Description of the Related Art

Cellular phones and other types of mobile communication devices are becoming increasingly pervasive devices in every day usage. Spurring the proliferation of these devices is the ability to conduct voice communication, which is a fundamental part of the daily communication that occurs on the devices and data services such as web, email and Multi-media messaging service. In addition to enabling voice and data communication (i.e., calls), many of these devices can provide additional functionality, including the ability of the user to record and store pictures and video clips with voice (or speech) based content, and the ability to allow live video playback of special events such as Olympic matches, or IPTV feed on the device. In such devices, the user is able to tag existing content (or currently recorded content) such as a photo with a voice tag, recorded as an audio file. Once stored on the device, the user typically retrieves the stored content by performing a manual search or some other form of search.

Thus, cellular phones and other communication devices typically provide a search function on the device support for performing searches within content that is stored/maintained on the device. The majority of these search functions are performed using a text-based search technology. In text based search technology, "words" (or character combinations) plays a critical role. These words may be manually inputted into the device using the devices input mechanism (keypad, touch screen, and the like); however, in more advanced devices, the words are provided as audio data that is spoken by the user and detected by the devices microphone.

With existing technology, when a search is to be conducted on stored audio data, performing the search requires both the audio data and the audio query be converted into their respective text representation, which are then utilized to complete the search via text matching. That is, the searching methodology is based on voice-to-text, wherein words are first converted into text using a dictionary of known spoken words/terms. The method commonly utilized relies on a use of phonemes derived from the audio data to perform searches and is referred to as a process of discovering "words" from audio data input remains a challenging task on mobile communication devices. It is also a difficult task on a server-based computer system because the performance of the speech recognition system is dependent on the language coverage and word-coverage of the dictionaries and the language models.

A recent phoneme-based approach to deciphering audio data (for searching) does not need actual word discovery. But, the approach makes uses of very limited contextual information, and involves sequentially processing the features of audio data. The approach thus needs to sequentially process the features of the audio data, and the limited locality information results in an expensive fine match.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
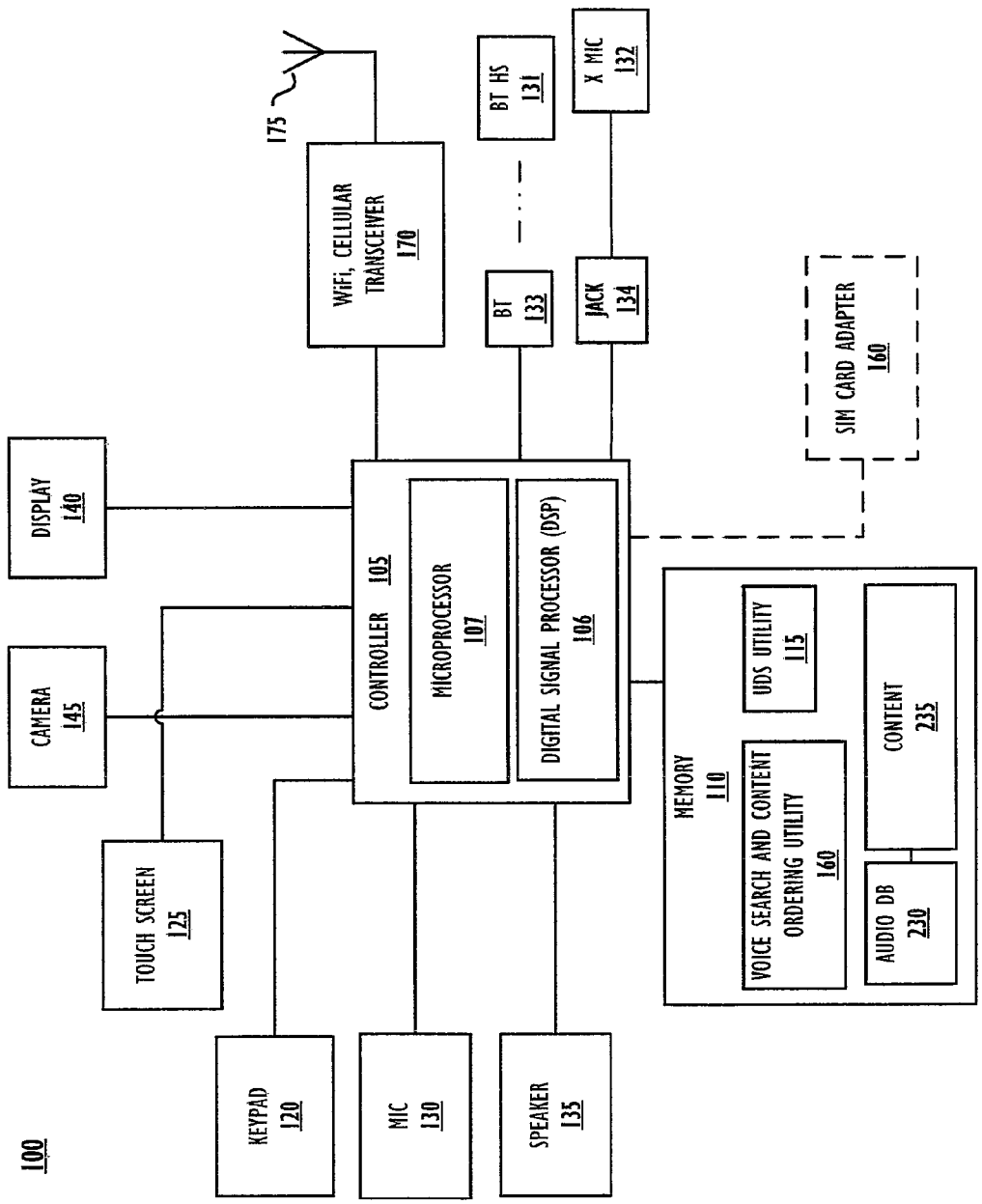
FIG. 1 is a block diagram of an example mobile communication device configured with hardware and software components for providing uniterm generation/discovery and voice-to-voice search functionality, in accordance with embodiments of the invention.

The illustrative embodiments provide a method, system and communication device for enabling ordered content retrieval via uniterm discovery from audio tags associated with stored content and voice-to-voice searching of the audio tags using a phoneme lattice generated from the received voice query. The method includes storing content and tagging at least one of the content with an audio tag. The method further includes receiving a voice query to retrieve content stored on the device. When the voice query is received, the method completes a voice-to-voice search utilizing uniterms of the audio tag, scored against the phoneme latent lattice model generated by the voice query to identify matching terms within the audio tags and corresponding stored content. The retrieved content(s) associated with the identified audio tags having uniterms that score within the phoneme lattice model are outputted in an order corresponding to an order in which the uniterms are structured within the voice query.

Audio/voice input signal is received (or captured) by a microphone or other audio receiving device. The audio signal is stored as audio data and sent to a uniterm discovery and search (UDS) engine within the device. The audio data may be associated with other non-audio content that is also stored within the device. The UDS engine retrieves (or discovers) a number of uniterms from the audio signal and associates the uniterms with the audio data. The uniterms for the audio database are organized as a phoneme uniterm tree structure to ensure an efficient coarse search. When a voice search is initiated at the device, the UDS engine generates a statistical latent lattice model from the voice query and scores the uniterms tree from the audio database against the latent lattice model. Following a further refinement, the best group of uniterms are then determined and segments of the stored audio data and/or other content, such as the best phoneme paths, corresponding to the best group of uniterms are selected as the candidate list of inputs for the fine search. The fine search is then conducted based on the match between the best paths of the candidate list and the query lattice. The final results are produced from the fine search ranks of the candidate list.

In the following detailed description of exemplary embodiments of the invention, the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized. Specifically, as utilized herein, the term "uniterm" is defined as a sequence of symbols (or phoneme strings) derived from segments of audio data stored within an audio database. Within the latent statistical model, provided below, the uniterms are be represented as symbols (X1 . . . Xn) that are then scored against the latent statistical model using a set of probabilities, as defined herein.

Also, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIG. 1 and 2xx for FIG. 2). The specific numerals assigned to the elements are provided solely to aid in the description and not meant to imply any limitations (structural or functional) on the invention.

With reference now to the figures, FIG. 1 depicts a block diagram representation of an example device within which the features of the invention are practiced. Specifically, the device is illustrated having components that enable the device to operate as a mobile communication device, such as a cellular/mobile phone. Thus, for consistency throughout the description, the device is referred to as communication device 100. It is however appreciated that the features of the invention described herein are fully applicable to other types of devices (including other communications devices, other than cellular phones, and other computing devices) and that the illustration of communication device 100 and description thereof as a mobile phone is provided solely for illustration. For example, communication device may be a personal digital assistant (PDA), a Blackberry™, an Ipod®, or other similar potable device, which is designed or enhanced with the functionality to store content associated with voice/audio data and perform a search of the content using voice-to-voice searching, as described herein. Similarly, while described as a portable or mobile device, the communication device may also be non-portable (e.g., a computer, a desktop phone, or vehicle-integrated car phone) with similar voice-to-voice search capabilities/functionality built in.

Returning now to FIG. 1, communication device 100 comprises central controller 105, which is connected to memory 110 and which controls the communications operations of communication device 100. Included among these operations are the generation, transmission, reception, and decoding of speech (or audio), encoded light, and data signals. As illustrated, controller 105 comprises digital signal processor (DSP) 106, which handles the receipt and microprocessor 107, which controls the overall functions of communication device 100. While shown as separate components, it is understood that the functionality provided by both processing components within controller 105 may be integrated into a single component. It is further appreciated that the functions of both components operate in concert, where necessary, to provide the uniterm discovery and voice-to-voice search features of communication device 100. In one embodiment, microprocessor 107 is a conventional multi-purpose microprocessor, such as an MCORE family processor, and DSP 106 is a 56600 Series DSP, each device being available from Motorola, Inc.

Communication device 100 also comprises input devices, of which keypad 120, and microphone (mic) 130 are illustrated connected to controller 105. Microphone 130 represents any type of acoustic capture/receiving device that detects/captures audio (or acoustic) sounds/signals that may be converted into a digital/analog representation and manipulated within communication device 100. In addition to the internal microphone 130, communication device also supports receipt of voice/audio input via one or more externally connected/coupled devices, including Bluetooth® (BT) headset 131 (paired with internal BT adapter 133) and wired microphone 132 (inserted into plug-in jack 134). Additionally, communication device 100 comprises output devices, including speaker 135 and display 140. Communication device 100 includes a camera 145, which enables communication device 100 to record still images and/or moving video.

The above described input and output devices are coupled to controller 105 and allow for user interfacing with communication device 100. For example, microphone 130 is provided for converting speech (voice or audio input) from the user into electrical signals (voice or audio data), while internal speaker 140 provides acoustic signals (output) to the user. These functions may be further enabled by a voice coder/decoder (vocoder) circuit (not shown) that interconnects microphone 130 and speaker 140 to controller 105 and provides analog-to-digital and or digital-to-analog signal conversion.

In addition to the above components, communication device 100 further includes transceiver 170, which is connected to antenna 175. Transceiver 170, in combination with antenna 175, enable communication device 100 to transmit and receive wireless radio frequency (RF) signals from and to communication device 100. Transmission 170 includes an RF modulator/demodulator circuit (not shown) that generates and deciphers/converts the RF signals. When communication device 100 is a mobile phone, some of the received RF signals may be converted into speech/audio signals, which are outputted via speaker 140.

Communication device 100 may be a Global System for Mobile communications (GSM) phone and include a Subscriber Identity Module (SIM) card adapter 160. SIM card adapter 160 enables a SIM card (not specifically shown) to be inserted and accessed by controller 105.

Those of ordinary skill in the art will appreciate that the hardware depicted in FIG. 1 may vary depending on implementation. Other internal hardware or peripheral devices may be used in addition to or in place of the hardware depicted in FIG. 1. Thus, the depicted example is meant solely for illustration and is not meant to imply architectural limitations with respect to the present invention.

In addition to the above hardware components, several functions of communication device 100 and specific features of the invention may be provided as programmable code or software-enabled logic, which are maintained within memory 110 and executed by microprocessor 107 (or DSP 106) within controller 105. For simplicity in describing the software/firmware/logic aspects of the invention, the combination of code and/or logic that collectively provides the first functional features of the described embodiments is referred to herein as Uniterm Discovery and Searching (UDS) utility 115 (or interchangeably referred to as Voice-to-Voice Search (VVS) utility). The functionality of UDS utility 115 will be described in greater detail below with reference to FIGS. 2-6. The combination of code and/or logic that collectively provides the second functional features of the described embodiments is referred to herein as Voice Search and Content Ordering (VSCO) utility 160. The functionality of VSCO utility 160 will be described in greater detail below with reference to FIGS. 2, 7-8.

When executed by microprocessor 107, key functions provided by UDS utility 115 include, but are not limited to: (1) retrieving/discovering one or more uniterms from audio data and associating the discovered uniterms with content stored within the communication device 100; (2) maintaining an audio database (230, FIG. 2) with the audio data and discovered uniterms; (3) when a voice search is initiated (i.e., a voice query detected) at the device 100, generating a statistical latent lattice model from the voice query and scoring the terms stored in the database against the latent lattice model utilizing a series of probability evaluations to produce a set of best "scoring" uniterms, corresponding to specific ones of the stored content; and (4) returning the content associated with the best uniterms as the result of the voice query. The returned content is identified by an audio label/tag from which the best scoring uniterm(s) were generated.

In addition to the above searching functionality provided by the UDS utility 115, the VSCO utility 160 also provides several additional functionalities, when the VSCO utility 160 is executed by microprocessor 107. Among these functions provided by VSCO utility 160 are, without limitation: (1) enabling a linking/tagging of each content with a voice tag; (2) storing the content along with the associated voice tag; (3) retrieving keywords from a voice query and storing an ordering sequence of the keywords relative to each other; performing the voice-to-voice search utilizing the UDS utility 115; (4) sorting returned content based on the ordering sequence of corresponding keywords that retrieved the returned content; and (5) outputting the content in the ordered sequence; and (6) enabling storage of the ordered sequence of returned content as a new content, tagged with a new audio tag.

Aspects of the disclosed embodiments provide a process of generating a "dictionary" representation for voice search (during a uniterm Discovery Process) and then utilizing this dictionary in voice search (during a Search Process). The invention involves extracting phoneme strings from segments of audio data in which the phoneme string is considered to be a good estimate of the actual phonetic content by virtue of the phoneme string's consistency within the phoneme lattice. These phoneme strings, extracted from all of the utterances in an audio database, play the role of words in subsequently attempting to match a new utterance having the same lexical content. The invention seeks to identify which of these "words" (referred to herein as "uniterms") also appear with consistency within the lattice representation (i.e., the statistical latent lattice model) of a new utterance. The identified uniterms allow the incoming utterance to be associated with the corresponding content in the audio database.

One embodiment of the invention provides a sememeless term (or ?vocabulary?) discovery strategy, where a sememe is a unit of transmitted or intended meaning (of a smallest unit of word). The invention recognizes that use of a sememeless term or discovery strategy is more practical since the audio segments may contain non-speech sound such as noise and music, or foreign terms, names of people, and places that are missing from the dictionary. The invention further recognizes that performing searches with vocabulary such as "in dictation" is very challenging on mobile devices with limited computational power. The voice-to-voice methodology requires very little computational power for large vocabulary conversational speech recognition (LVCSR). Within the descriptions herein, the term "uniterms" is utilized to reference the sememless terms, and both terms may be utilized interchangeably.

One embodiment of the invention enhances the phoneme-based approach to performing voice searches. According to the described embodiment, voice-to-voice searches are provided without requiring "?word?" discovery, by adding the use of contextual information, and thus eliminating the need for sequential processing of audio data. The functionality of the described embodiments also removes the explicit word boundaries in the audio database, when compared with voice to text search. Embodiments of the described invention makes use of the sememeless term (or ?vocabulary?) discovery strategy. As described in greater details below, during the discovery process, phoneme recognition is performed on the utterances and a phoneme lattice is generated. During the search process, the top N branches (uniterms) with best scores from the uniterm tree are determined and kept, and then a fine search is performed on the lattice associated with the top N uniterms. The described embodiments thus provide a more practical and efficient solution to evaluate audio segments, which may contain none-intelligence speech or sounds, such as noise and music, and/or foreign terms, names of people, and places that are not represented within a standard language dictionary.

Figure 2:
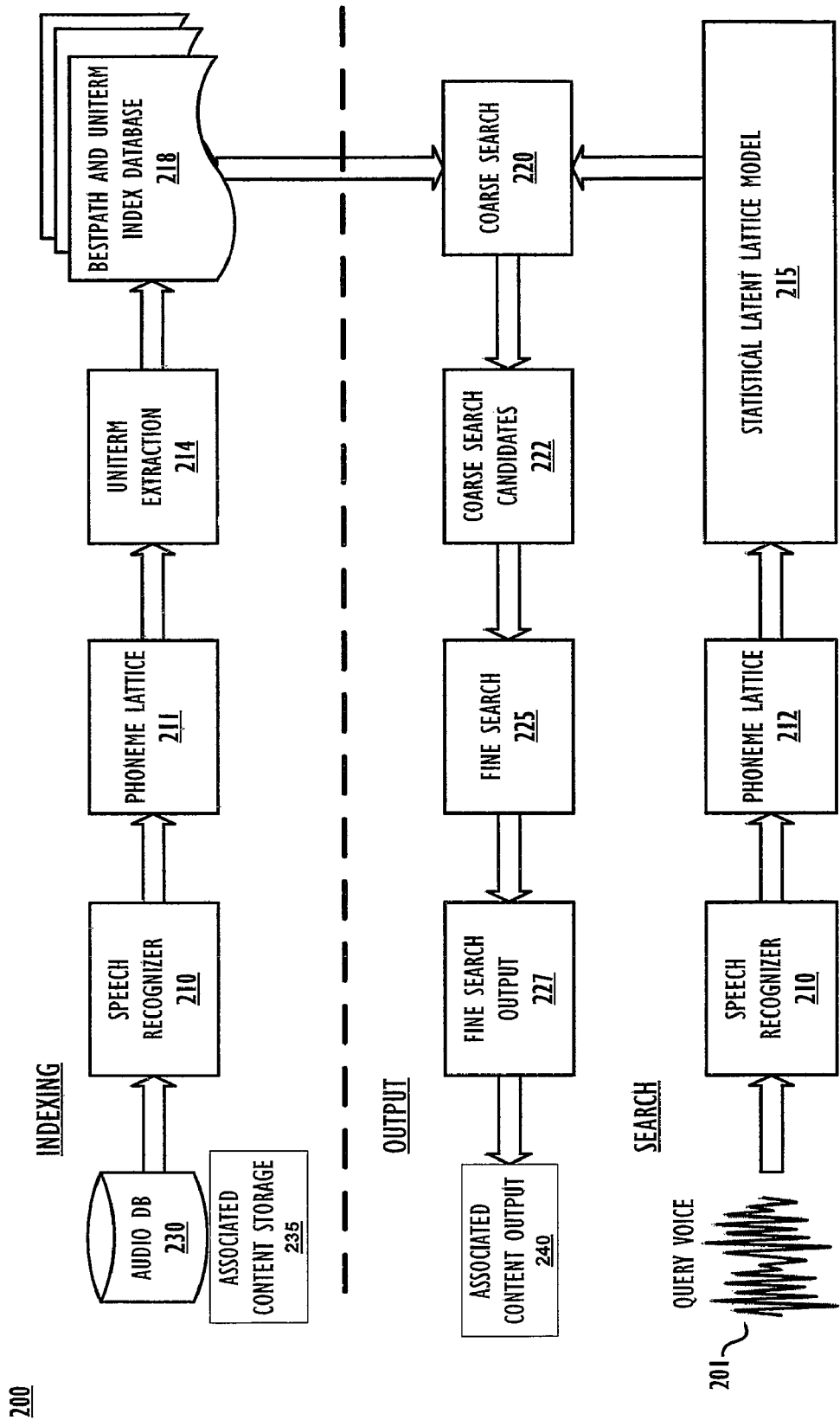
FIG. 2 is a sequence diagram illustrating use of hardware and software components to complete the sequence of operations during uniterm discovery/generation and voice-to-voice searching using the discovered uniterms, in accordance with one embodiment of the invention.
Figure 3:
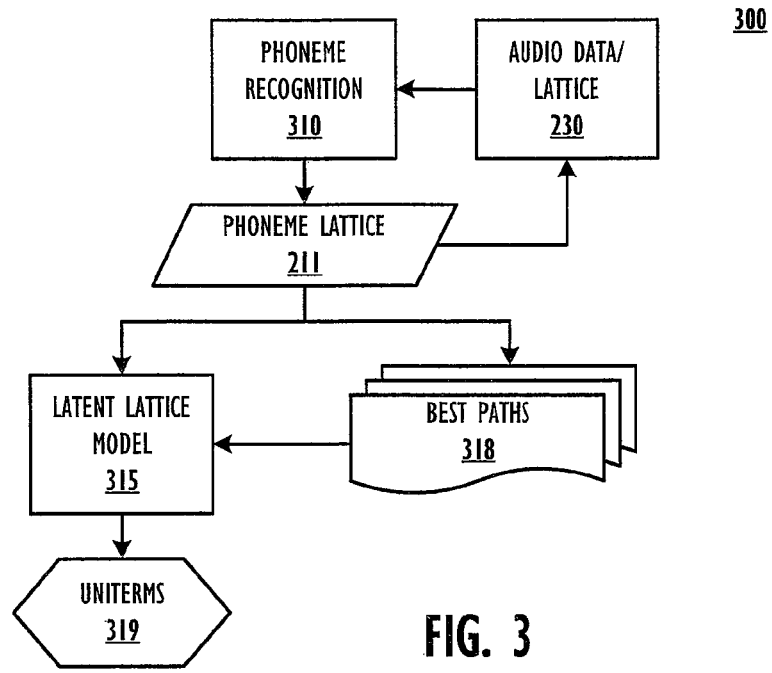
FIG. 3 is a block diagram illustrating an isolated view of the uniterm generation/discovery engine, according to one embodiment of the invention.
Figure 5:
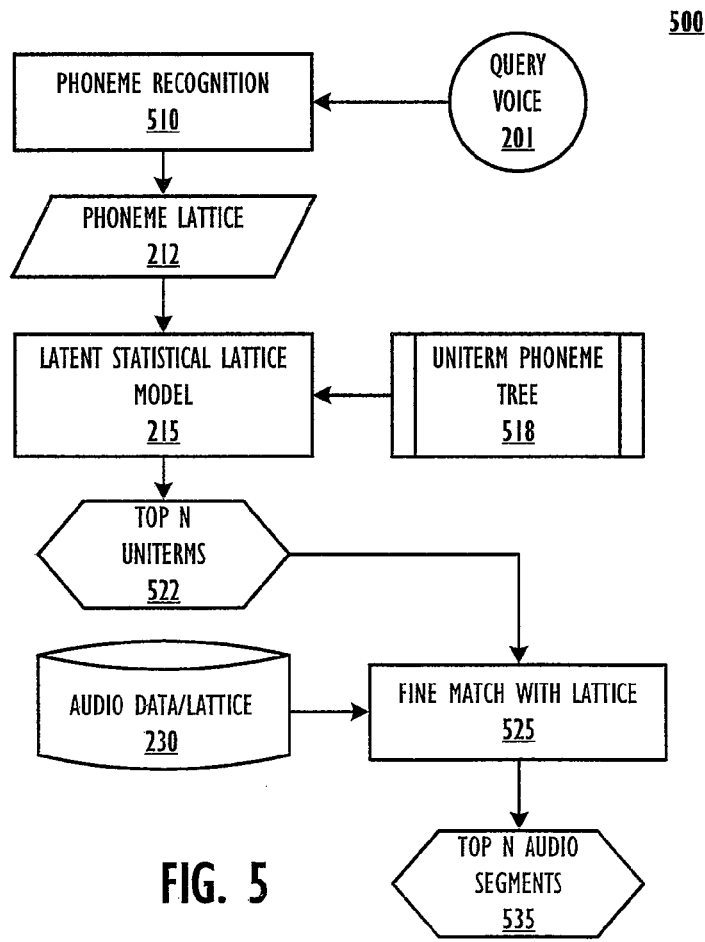
FIG. 5 is a block diagram illustration the functional components utilized to complete voice-to-voice searches, utilizing uniterms and a statistical latent lattice model generated from a speech query, in accordance with one embodiment of the invention.
Figure 8:
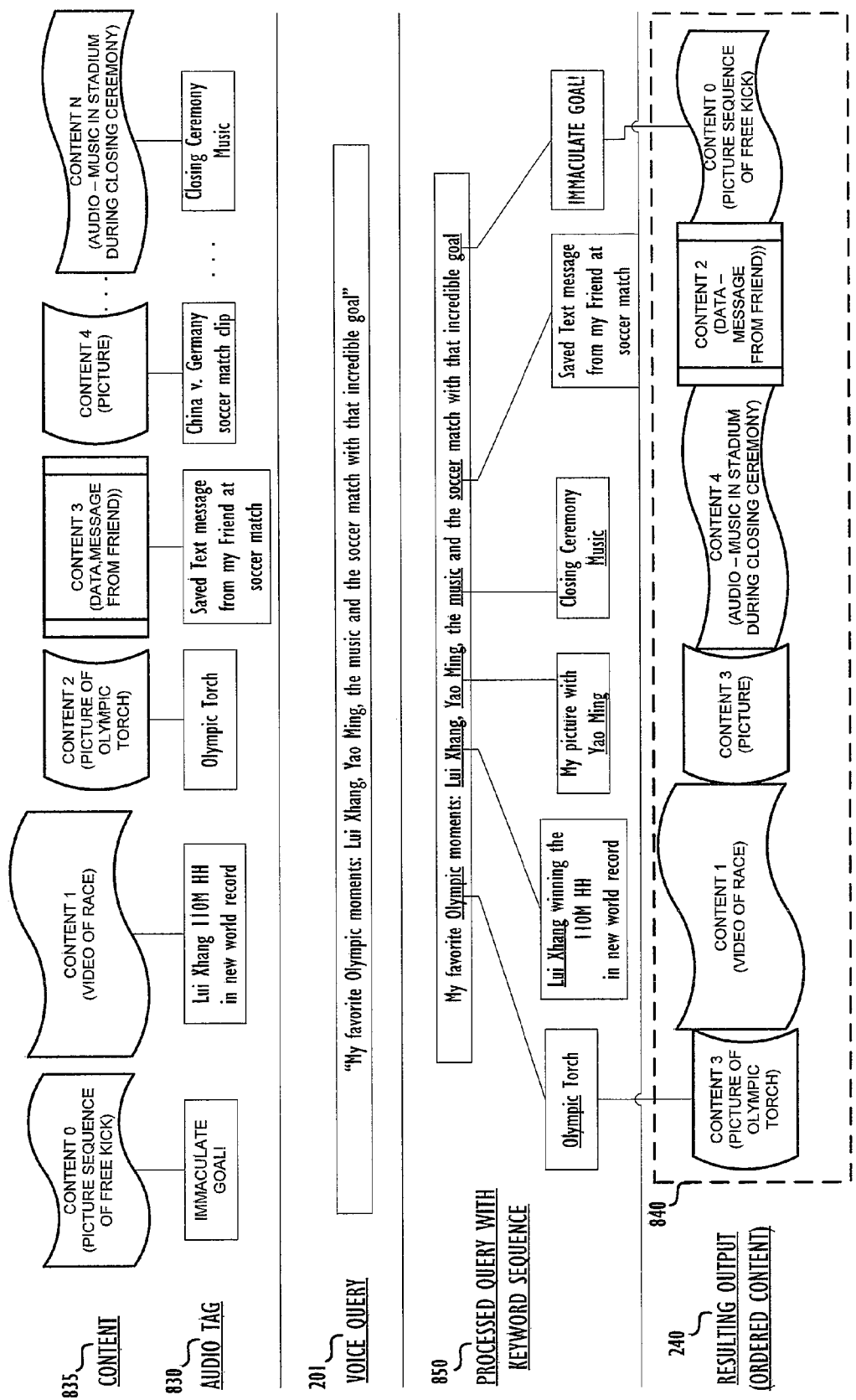
FIG. 8 is a block diagram representing the stored content and retrieval of stored content in an order based on a voice query with corresponding key words, according to one embodiment of the invention.

With reference now to FIG. 2, there is illustrated a block diagram of key hardware and software components of a UDS engine utilized to complete the uniterm discovery and indexing and the voice-to-voice search and output features of the invention. UDS engine 200 comprises functional components (i.e., hardware and functional software/utility) within communication device 100, which functional components complete specific portions of uniterm discovery and indexing (which are also illustrated by FIG. 3) and uniterm searching (which is also illustrated by FIG. 5), and content retrieval, ordering and outputting (which are illustrated by FIG. 8). Within FIG. 2, the content retrieval, ordering and outputting are generally represented by fine search output 227 and content output 240, although portions of the functionality involved in generating fine search output (which is audio output) are linked into the uniterm searching functionality.

As shown, the searching side of UDS engine 200 includes the following functional components with the corresponding, described functionality:

(a) speech recognizer 210, which receives audio/voice input (voice query) 201 and performs a recognition function to generate a corresponding phoneme lattice 212. The phoneme lattice is utilized to generate a statistical latent lattice model 215, which is utilized to score uniterms that are stored within the audio database 230 (or within bestpath and uniterm index database 218);

(b) coarse search function 220 (which is a basic uniterm scoring subroutine that performs an initial scoring of all uniterms within the bestpath and uniterm index database 218), scores the uniterms (specifically, the phoneme uniterm tree) of the stored audio/voice data and retrieved from bestpath and uniterm index database 218 against the statistical latent lattice model 215. The scoring is performed via a process involving a series of probability analyses, described below. Coarse search function 220 generates coarse search candidates 222 as the result of scoring the uniterms (or uniterm tree) against the statistical latent lattice model 215; and (c) fine search function 225 (which is a more specific uniterm scoring subroutine, which only scores the results of the coarse search function 220), receives the coarse search candidates 222 from the coarse search function 220 along with a copy of the phoneme lattice 212 from speech recognizer 210. Fine search function 225 performs a more refined analysis of the phoneme lattice compared with the coarse search candidates to generate fine search output 227. Fine search output 227 is the result produced (i.e., content retrieved from audio database) as the output of the voice-to-voice search initiated by voice query 201, which search is performed using the set of stored uniterms (or phoneme uniterm tree) and the statistical latent lattice model 215 generated from the voice query 201.

According to an illustrative embodiment, a voice query 201 is received (on the searching side of the UDS engine 200 (FIG. 2)) to search for particular content that is identified by a previously stored voice/audio input. The voice query 201 is received and analyzed by the speech recognizer 210, which generates the voice query's phoneme lattice 212. Voice query 201 is received/detected by a speech input device of communication device 100 (FIG. 1), such as internal microphone 130, Bluetooth 131, and/or external microphone 132 (FIG. 1). In one embodiment, speech recognizer 210 may include or be associated with a vocodec, which converts the audio/voice signal into its representative audio/voice data.

In addition to the above functional components which produce the corresponding outputs from the described inputs, the indexing side of UDS engine further includes audio database 230, which is utilized to store the audio content, segments of which are later retrieved following the voice-to-voice search initiated by the voice query 201. The indexing side of UDS engine also includes content storage 235, which holds one or more content(s), some of which may be identified with a particular audio tag that is assigned to the content and maintained within audio database 230. Thus, as utilized herein, audio content within audio database 230 includes actual audio content (voice files, music files, and the like) as well as audio tags linked to other content within content storage 235). At some point after receipt of the initial audio content that is stored within audio database 230 (e.g., prior to or during the voice-to-voice search process), stored audio content from audio database 230 is sent through speech recognizer 210, which generates the audio content phoneme lattice 211.

In one embodiment, multiple phoneme lattices are generated, each corresponding to a segment of audio content within the audio database 230. The audio content phoneme lattice 211 is then passed through uniterm extraction function 214, which generates a plurality of uniterms corresponding to the different audio content (and segments thereof) within the audio database 230. The uniterms generated by uniterm extraction function 214 are stored within bestpath and uniterm index database 218, with the uniterms indexed according to some pre-established pattern to form a phoneme uniterm tree that is utilized during the coarse search function. The uniterms for the audio database are organized as a phoneme uniterm tree structure to ensure an efficient coarse search. The best paths are determined from the phoneme lattice and also stored within the bestpath and uniterm index database 218. During the voice-to-voice search uniterms and best paths are forwarded to the coarse search function 220 for scoring against the statistical latent lattice model 215.

As illustrated by FIG. 2, speech recognizer 210 receives audio/voice input and generates a corresponding phoneme lattice 211 and 212. On the indexing side of the UDS engine, UDS utility 115 (FIG. 1) performs feature extraction, with the generated phoneme lattice 211, using uniterm extraction function 215. On the indexing side of UDS engine 200, feature extraction generates a plurality of uniterms, represented via uniterm index (218) stored within bestpath & uniterm index database 218.

Unlike voice-to-text search, the voice-to-voice search functionality provided herein has no explicit word boundaries in the audio database (230). A user of the communication device (100) is able to simply utter a sequence of sounds to extract content (e.g., pictures, video, documents, from the content stored within the content storage 235 of the communication device) and audibly (by voice tagging/association) highlight the content or portions thereof.

As introduced above, performing the voice-to-voice search features of the described embodiments involves use of a statistical latent lattice model (215). According to this model, the probabilistic estimates that can be used in the phoneme lattice statistical model are phoneme conditional probabilistic estimates, and N-gram counts can be extracted from the phoneme lattice. Generally, an N-gram conditional probability is utilized to determine a conditional probability of item X given previously seen item(s), i.e. p(item X|history item(s)). In other words, an N-gram conditional probability is used to determine the probability of an item occurring based on N-1 item strings before it.

A bi-gram phoneme conditional probability can be expressed as $p(X_N|X_{N-1})$. For phonemes, if the first phoneme $(X_{N-1})$ of a pair of phonemes is known, then the bi-gram conditional probability expresses how likely a particular phoneme $(X_N)$ will follow. In the provided embodiment, a phoneme unigram "conditional" probabilistic estimate is simply the probabilistic estimate of X occurring in a given set of phonemes (i.e., the estimate is not really a conditional probability).

Smoothing techniques are utilized to generate an "improved" N-gram conditional probability. For example, a smoothed conditional tri-gram conditional probability $P(x|yz)$ can be estimated from unigram and bi-gram conditional probabilities as $$p(x|y,z)=\alpha^*p(x|y,z)+\beta^*p(x|y)+\gamma^*p(x)+\epsilon$$

where $\alpha$, $\beta$, $\gamma$ and $\epsilon$ are given constants based on experiments and with the condition that $\alpha+\beta+\gamma+\epsilon=1$.

As described above, the process also involves an evaluation of phoneme string scores. The following equation is provided to calculate the probabilistic estimate of a phoneme string $P(x_1x_2 \ldots x_M|L)$ associated with an indexing term (i.e., a uniterm or a phoneme string) from the best paths of a lattice L:

$$p(x_1x_2 \ldots x_M|L)=p(x_1|L)p(x_2|x_1,L) \ldots p(x_M|x_{M-1},L),$$

where $p(x_1x_2 \ldots x_M|L)$ is the estimated probability that the indexing term having the phoneme string $x_1x_2 \ldots x_M$ occurs in the utterance from which lattice L was generated. Further, the probabilistic estimate is determined from the unigram $[p(x_1|L)]$ and bi-gram $[p(x_M|x_{M-1},L)]$ conditional probabilities of the phoneme lattice statistical model.

The probability of occurrence, or probabilistic estimate of the phoneme string $p(x_1x_2 \ldots x_M|L)$ associated with an indexing term for a particular utterance for which a lattice L has been generated can be determined more generally as:

$$p(x_1x_2 \ldots x_M|L)=p(x_1|L)p(x_2|x_1,L)p(x_3|x_2,x_1,L) \ldots \\ p(x_M|x_{M-1}, \ldots x_{M+1-N},L),$$

where $p(x_1x_2 \ldots x_M|L)$ is the estimated probability that the indexing term having the phoneme string $x_1x_2 \ldots x_M$ occurred in the utterance from which lattice L was generated. The probability/probabilistic estimate is determined from N gram (e.g., for tri-gram, N=3) conditional probabilities $p(x_1|L)$, $p(x_2|x_1,L), \ldots, p(x_{M-1}|x_{M-1}, \ldots x_{M+1-N},L)$ of the phoneme lattice statistical model. The score of an uniterm can be calculated as:

$$S=\log(p(x_1x_2 \ldots x_M|L))/M + f(M),$$

where f(M) is a function which penalizes the short strings, for example f(M)=b*log(M) and b=0.02.

In the above description, it is appreciated that while the N used for the N gram conditional probabilities typically has a value of 2 or 3, other values, such as 1 or 4 or even values greater than 4 could be, used. A value of 1 for N may diminish the accuracy of the embodiments taught herein, while a value of 4 and higher (for N) may require ever increasing amounts of processing resources, with diminishing amounts of improvement, in some implementations. The value M, which identifies how many phonemes are in an indexing term, may be in the range of 5 to 10. This probabilistic estimate, which is a number in the range from 0 to 1, is used to assign a score of the indexing term. For example, the score may be identical to the probabilistic estimate or may be a linear function of the probabilistic estimate.

Figure 4:
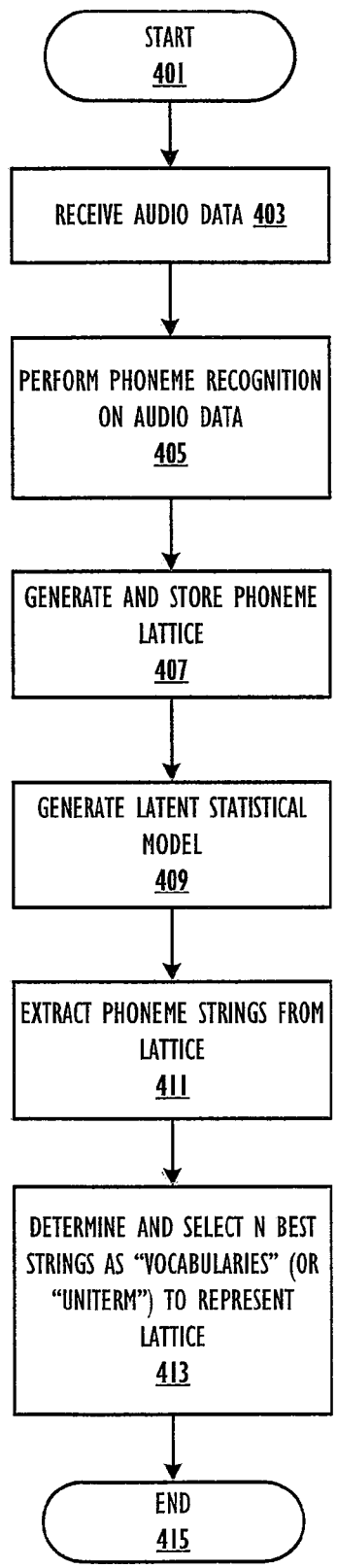
FIG. 4 is a flow chart of the method by which the uniterms are generated (or discovered) from voice/audio input, according to one embodiment of the invention.

Turning now to FIGS. 3 and 4, which respectively illustrate the functional components and method by which the uniterm discovery process is implemented, according to one embodiment. Specifically, FIG. 3 illustrates the interconnected functions that perform uniterm discovery (indexing) of an example UDS engine (200). The functions execute to first produce a phoneme lattice 211, from which best paths 318 and ultimately uniterms 319 are discovered. The functions of FIG. 3 and FIG. 2 (previously described) overlap and, therefore, only the differences and/or additional functionality presented in FIG. 3 are now described. Additionally, the functions of FIG. 3 are referenced when describing the method process (FIG. 4), which details the functional processes by which the uniterms are discovered (and indexed).

The process of FIG. 4 begins at block 401, and proceeds to block 403 at which stored audio/voice input is retrieved from audio database 230. The audio/voice data may have been originally received at/detected by an audio input device of communication device (100), and the audio data may be stored along with other non-audio content. That is, the communication device may provide a special audio receive mode, which allows received audio to be associated with other types of content (as a name/identifying/descriptive tag).

With the audio data received from audio database 230, phoneme recognition 310 is performed (by speech recognizer 210, FIG. 2) on the received audio/voice data, as shown at block 405. At block 407, a phoneme lattice 211 is generated. Then, a latent lattice model 315 is produced from the generated phoneme lattice(s) 211, at block 409. The phoneme lattice 211 is evaluated and phoneme strings with certain lengths are extracted from the phoneme lattice(s) as best paths 318, as provided at block 411. In one embodiment, the phoneme strings with a length that is at least equal to a pre-set minimum length are extracted from (or identified within) the phoneme lattice(s) as the one or more best paths 318. These best paths 318 are then scored against the latent lattice model 315 (i.e., latent lattice model 315 is evaluated using the best paths 318). At block 413, the top N best strings (referred to as uniterms) 319 are chosen as the "vocabularies" to represent the phoneme lattice 211 (i.e., represent the audio data segments). Thus, best paths 315 are extracted from the phoneme lattice 211, and then the N best phoneme strings (uniterms) 319 are extracted from the latent lattice model 315 according to the best paths 318. The process then ends at termination block 415. As described above, the discovered uniterms may be stored in an indexed format to provide a phoneme uniterm tree that may be utilized for performing the coarse search function, described below.

As provided by FIG. 2, the search process is completed via two search functions: a coarse search function, followed by a fine search function. With the coarse search function, the UDS utility 115 looks up the feature vector in the index and quickly returns a set of candidate messages, which may contain five to ten times more messages than needed. Following that coarse search, the fine search function compares the best path of the voice query to the phoneme lattices of the candidate messages, uniterm by uniterm.

Additionally, in some implementations, multiple different voices may record different content with similar words utilized to describe the different content. One functionality provided by the invention involves being able to match content related to specific uniterms, while being able to differentiate voices based on contextual information. As an example, given one query, there may be two to three content items spoken by different speakers hidden in the multiple number of segments of audio data.

Figure 6:
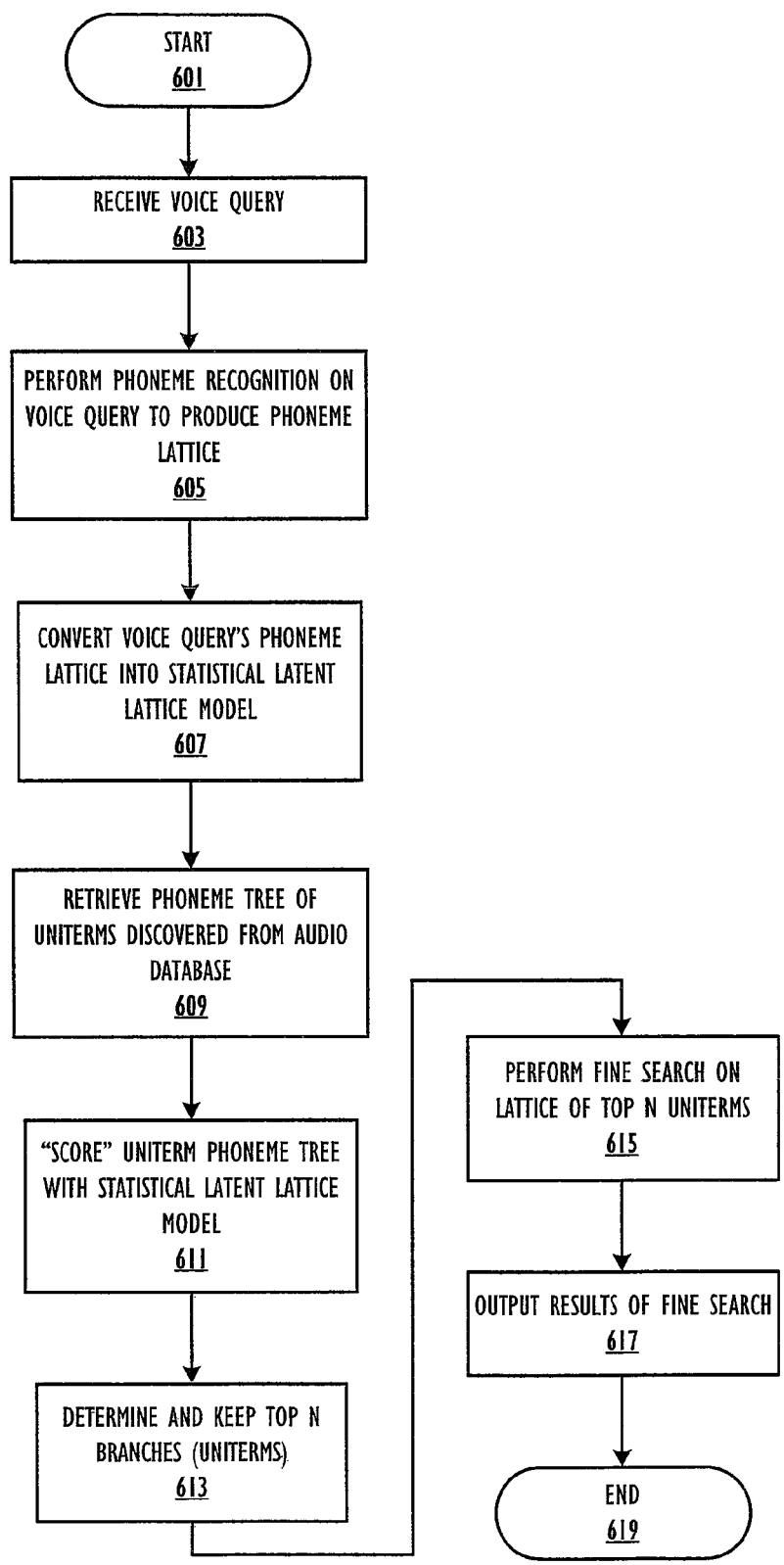
FIG. 6 is a flow chart of the method by which a search is completed using uniterms that are generated from voice/audio input, according to one embodiment of the invention.

FIGS. 5 and 6 illustrate the functional components and method by which uniterm searching within the voice-to-voice search application is implemented, according to one embodiment. Specifically, FIG. 5 illustrates interconnected functions that perform uniterm searching for a voice query within an example UDS engine (200). The functions execute to first produce a query phoneme lattice, from which uniterms are discovered and then matched. Similarly to FIG. 3 above, the functions of FIG. 5 and FIG. 2 (previously described) overlap and, therefore, only the differences and/or additional functionality presented in FIG. 5 are now described. Additionally, the functions of FIG. 5 are referenced when describing the method process (FIG. 6), which details the functional processes by which the uniterms (of the stored audio data) are scored against the latent statistical lattice model generated from a voice query to perform voice-to-voice searching within the communication device (100).

The method of FIG. 6 begins at block 601 and proceeds to block 603, which illustrates receipt of a voice query 201 at the communication device 100 (FIG. 1). At block 605, phoneme recognition is performed (via speech recognizer 210) on the voice query 201 to produce phoneme lattice 212 of the voice query. The UDS utility 115 converts the voice query's phoneme lattice 212 into a latent statistical lattice model 215, at block 607. Also, at block 609, the UDS utility 115 retrieves a uniterm phoneme tree 518, which is a prefix tree built from all the "uniterms" discovered from the audio database (230). Following, at block 611, the UDS utility 115 scores the phoneme tree 518 against the latent statistical lattice model 215 (i.e., performs a statistical probability of a match of the uniterms to the latent lattice model 215). Based on the resulting scores, the UDS utility 115 determines which branches of the uniterm phoneme tree are the top N branches (or uniterms) 522, and the UDS utility 115 keeps these top N branches 522, as provided at block 613. The top N branches are those branches with the best scores, and the UDS utility evaluates all of the resulting scores to determine which branches of the uniterm tree are the top branches, which have one of a highest score relative to other branches or a score above a pre-set minimum score. The segments of the stored audio data and/or other content, such as the best phoneme paths, corresponding to the best group of uniterms are selected as the candidate list of inputs for the fine search.

The final results produced from the fine search are selected from the ranks of this candidate list. With the top N branches (or uniterms) identified, UDS utility 115 performs a fine match/search using the voice query's phoneme lattice 212, as shown at block 615. In one embodiment (as illustrated by FIG. 5), the UDS utility 115 utilizes the phoneme lattice (211, FIG. 2/3) of the stored audio data (in database 230) as an input, along with the top N branches (729), to perform the fine search. The resulting top N audio segments 535 resulting from the fine search (525) are outputted (e.g., presented to the querying user), as shown at block 617. Then, the process ends at block 619.

FIGS. 5 and 6, described above, illustrate various methods by which the above processes of the illustrative embodiments are completed. Although the methods illustrated in FIGS. 5 and 6 have been described with reference to components shown in the other figures, it should be understood that this is merely for convenience and alternative components and/or configurations thereof can be employed when implementing the various methods. Key portions of the methods may be completed by UDS engine 200 (FIG. 2) and corresponding UDS utility 115 (FIG. 1) executing within communication device 100 (FIG. 1) and controlling specific operations of/on communication device 100, and the methods are thus described from the perspective of either/both UDS engine 200 and UDS utility 115.

Figure 7:
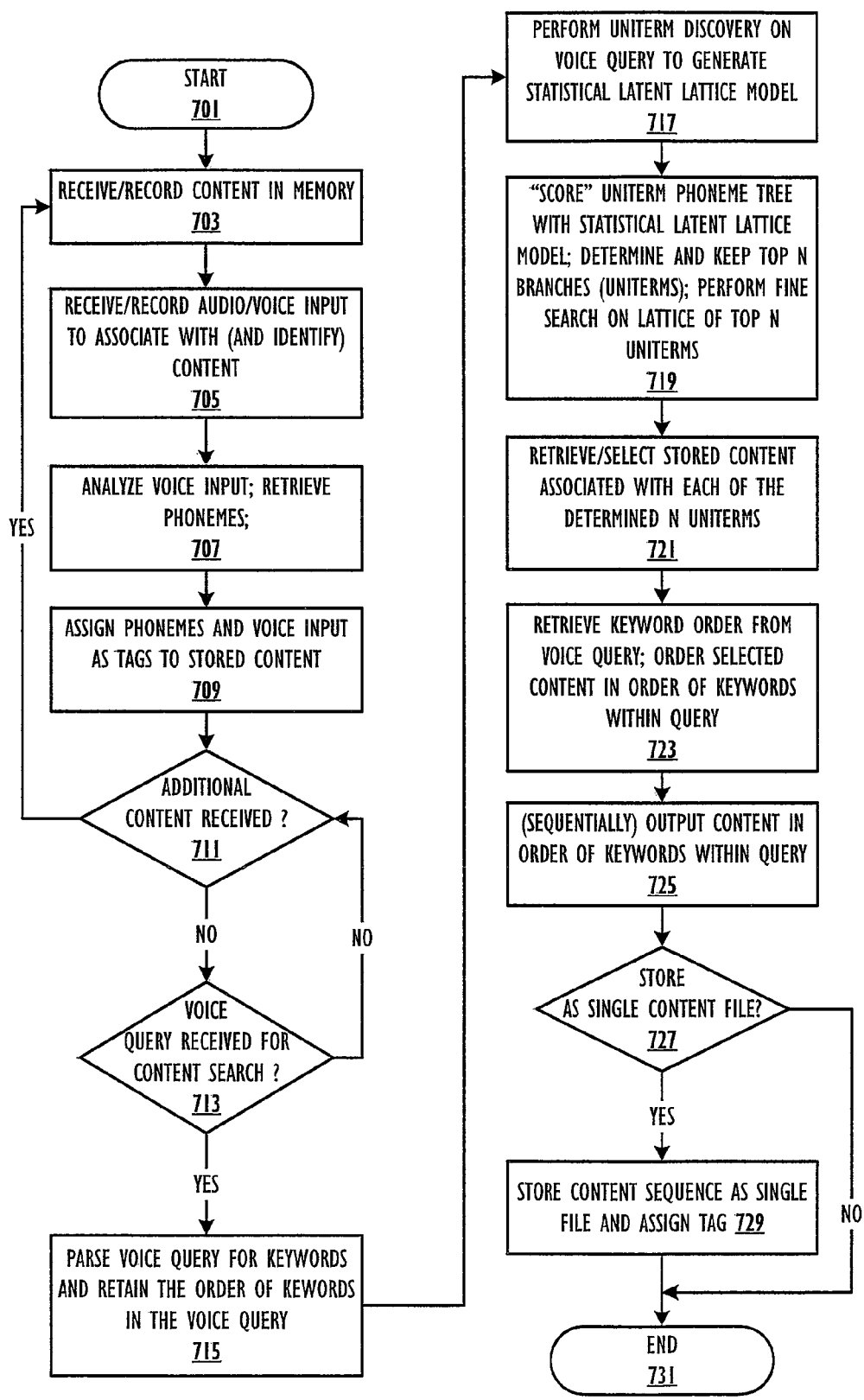
FIG. 7 is a flow chart of the method by which a voice string is utilized to conduct a search for multiple stored content utilizing uniterm discovery, in accordance with one embodiment of the invention.

Turning now to FIGS. 7 and 8, which together illustrate and describe the mechanisms and methods by which the VSCO utility 160 (FIG. 1) receives and responds to a voice search/query string by retrieving content and ordering the content according to the order of key terms/words within the string. The descriptions of both figures are intertwined due to the overlap in functionality being illustrated. The method of FIG. 7 begins at block 701 and proceeds to block 703 at which the device receives and records content in memory or storage. As shown by FIG. 8, multiple different types of content 835 may be stored within the device. For example, the content 835 may be in the form of still pictures/images (content 2 and 4), a sequence/stream of still images (content 0), video (content 1), data messages, such as a text message (content 3), and recorded audio (content N). As many as N different contents may be stored within the memory/storage of the device, where N is any integer number that is capped when the memory/storage reaches capacity. Notably, also, while different types of content are illustrated and described, the functionality provided by the embodiments apply to a multiple ones of a single type of content (e.g., pictures) or even a single content.

Referring to FIG. 7 again, at block 705, the device receives audio/voice input to associate with a specified content. The audio/voice input then represents an identifier of the specific content. The association of the audio/voice input may be initiated by a user selecting a functional affordance (physical button, menu option, or touch screen button, for example) that causes the device's logic to monitor for receipt of an audio input and link the received audio input to a selected content, in order to identify the selected content. The content may be recently captured or received content or may be previously stored content. The content is then resaved along with the associated audio/voice tag (or voice ID). As shown by FIG. 8, each content (0 ... N) have an associated audio tag 830, which provides identifying information about the stored content. In other implementations, only a subset of the stored content (0 ... N) are actually tagged with voice IDs, as the voice IDS have to be specifically entered by a user of the device or preprogrammed for automatically tagging newly stored content. It should be noted also that the audio tags 830 are not necessarily descriptive of the content being identified by the particular audio tag 830. Use of descriptive audio tags 830 serve only to simplify the description of the specific embodiment described herein.

At block 707, the UDS utility 115 performs the analysis of the stored voice IDs to retrieve phonemes and generate a lattice (similar to the description presented above with reference to FIGS. 5 and 6. At block 709, the VSCO utility 160 associates the phonemes with the voice IDs and/or the stored content. Whenever additional content is received and stored, as determined at block 711, the VSCO utility 160 and UDS utility 115 performs the processes of blocks 703-711. At block 713, the VSCO utility determines whether the device receives a voice query for content search. The voice query may be inputted as a special form of query that triggers a response with a grouped sequence of content, having associated audio data, as determined via the uniterm scoring features provided by UDS utility 115. An example voice query 201 is illustrated in FIG. 8.

When the device receives a voice query, the voice query is parsed for keywords and the order of the keywords in the query is detected and recorded, at block 715. Then, the keywords are transmitted to UDS utility 115, which performs the uniterm discovery on the keywords to generate a statistical latent lattice model, as shown at block 717. The UDS utility then sores the uniterms (derived from the audio tags) with the latent lattice model to determine the top N uniterms, as provided at block 719. Examples of these keywords are represented in the processed query with keyword sequence 850 of FIG. 8. Thus, with the above example of a person's China Olympic experience, the keywords (with corresponding order) are: Olympic, Lui Xhang, Yao Ming, music, soccer, and goal. While illustrated as nouns and proper nouns, the illustrative embodiments may provide keywords that are not nouns/proper nouns. As further shown by the processed query and keyword sequence 850, the uniterms derived from similar words within the audio tags 830 are scored against the selected keywords (which are converted into the latent lattice model by UDS utility 115). This scoring yields a set of uniterms, which correspond to specific ones of the audio tags 830.

At block 721, the VSCO utility 160 retrieves the stored content corresponding with the respective audio tags from which the uniterms were generated. The VSCO utility 160 also retrieves the sequence/order of the keywords within the voice query string and orders the stored content according to the initial ordered sequence of the keywords, as shown at block 723. Depending on implementation, the ordered sequence may be determined by the UDS utility 115 performing the uniterm scoring against a series of latent lattice models generated for each keyword in the order in which the keyword is detected/received. At block 725, the VSCO utility 160 provides an output of the content in keyword-order. FIG. 8 illustrates an example resulting output 240, which includes a sequencing of ordered content, in the order corresponding to the keyword-order. Then, if a request is received at decision block 727 to save the output as a single content file, the sequence of individual contents retrieved by the search query string are stored in ordered sequence as a single content 840 (FIG. 8) with a single tag, as provided at block 729. Then the process ends at block 731.

With the above description of an illustrative embodiment, the method enables a device user to tag stored content, such as photo and video images with a voice tag. Once the tags are established, the user is then able to retrieve the content in a desired order by simply uttering a sequence of words/sound, which provides phonemes similar to those within the voice tag.

In one embodiment, a device user is able to extract video from the stored collection of multiple videos and highlight certain video segments from a long video with an audio tag. The user may then search the audio tags to retrieve the associated video contents stored on the device. As an example, while viewing and/or recording a soccer match as a video stream on the communication device, the user may annotate a particular portion of the match by adding audio tag (e.g., "GOAL") to a particular segment of the video stream. When the audio tag is added, the audio tag is linked to a particular segment (a video clip) of the video stream, a copy of which is created and extracted as a separate clip. The user may also make other video clips of other events, which video clips are also stored with specific audio tags.

With the collection of video clips stored with their respective audio tags, the user, utilizing the functionality of the UDS utility 115 and VSCO utility 160 within the process of FIG. 7, is later able to assemble the separate video clips in a particular sequence by providing a voice query that incorporates similar words and phrases as the audio tags. Thus, with the above example content (FIG. 8), the person may make a combined video from the stored video clips, by saying "during the soccer match between China and Germany, I saw the most amazing goal," for example. With this voice query entered using a pre-programmed function that enables creation of a combination video from multiple stored video clips, the VSCO utility 160 receives the command and automatically activates the UDS utility 115 to complete the voice to voice search. Following the VSCO utility 160 performs the ordering and combining of the video clips for sequential presentation, based on the keyword order for uniterms discovered within the received voice/audio query.

In the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Thus, as described herein, the illustrative embodiments provide a communication device and a method which includes the following: (a) storing one or more content that includes one or more of text, images, audio, videos, and multimedia content; (b) tagging at least one of the one or more content with an audio tag; (c) receiving a voice query to retrieve content from the one or more content stored on the device; (d) completing a voice-to-voice search utilizing uniterms of the audio tag and a phoneme latent lattice model generated from the voice query to identify audio tags, which are tagged to stored content and which provide one or more uniterms that scores within the phoneme lattice model; and (e) outputting retrieved content associated with the identified audio tags having uniterms that score within the phoneme lattice model, wherein the retrieved content is outputted in an order corresponding to an order in which the uniterms are structured within the voice query.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

As an example, in one embodiment, the software aspects of the invention are provided on a computer disk that is provided with the cell phone or other portable device, and the functionality of the UDS engine and/or UDS utility may be uploaded to the device using a computer with USB (Universal Serial Bus) connection or BT connection. Alternatively, the software may be downloaded from a service provider website or other online source. Also, the software may be bought off-the shelf as a generic software offering (i.e., not proprietary and/or packaged with the device).

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In an electronic device, a method comprising:
    storing, by the electronic device, content, wherein said content includes one or more of text, images, audio, videos, and multimedia content;
    tagging, by the electronic device, the content with an audio tag;
    receiving, by the electronic device, a voice query to retrieve content stored on the device;
    completing, by the electronic device, a voice-to-voice search utilizing uniterms of the audio tag and a phoneme latent lattice model generated from the voice query to identify audio tags tagged to stored content, which audio tags provide one or more uniterms that score within the phoneme lattice model; and
    outputting, by the electronic device, retrieved content associated with the identified audio tags having uniterms that score within the phoneme lattice model, wherein the retrieved content is outputted in an order corresponding to an order in which the uniterms are structured within the voice query;
    wherein said completing further comprises:
    generating, by the electronic device, one or more first phoneme lattices from audio tags;
    determining, by the electronic device, one or more best paths from the one or more first phoneme lattices;
    extracting, by the electronic device, one or more uniterms from the one or more first phoneme lattices;
    storing, by the electronic device, the one or more uniterms and the one or more best paths in a uniterm index database; and
        re-associating, by the electronic device, the one or more uniterms with corresponding stored content with the associated audio tag from which the uniterm was generated; and
    wherein extracting one or more uniterms comprises:
        generating, by the electronic device, a next latent statistical lattice model from the one or more phoneme lattices generated from the audio tags;
        extracting, by the electronic device, phoneme strings with a length that is at least equal to a pre-set minimum length from the phoneme lattices as the one or more best paths;
        scoring, by the electronic device, the one or more best paths against the next latent statistical lattice model; and
        identifying, by the electronic device, a preset number of best strings as the uniterms selected to represent the phoneme lattice.

2. The method of claim 1 further comprising:
    retrieving, by the electronic device, one or more keywords from the voice query;
    identifying, the electronic device, and maintaining a keyword order of the one or more keywords within the voice query as an output order for the retrieved content; and
    when the retrieved content is identified, outputting, by the electronic device, the retrieved content in the keyword order.

3. The method of claim 1 wherein said generating further comprises:
    forwarding, by the electronic device, the voice query to a speech recognizer, which speech recognizer evaluates received audio and generates one or more phoneme lattices from the received audio; and
    generating, by the electronic device, the phoneme lattice from the received audio;
    wherein the statistical latent lattice model represents an application of a series of statistical probabilities to the phoneme lattice.

4. The method of claim 1 wherein said completing further comprises:
    generating, by the electronic device, a latent statistical lattice model from one or more second phoneme lattices generated from the voice query;
    scoring, by the electronic device, a plurality of uniterms from the first phoneme lattices against the latent statistical lattice model to determine a set of best scoring uniterms; and
    retrieving, by the electronic device, content associated with the set of best scoring uniterms as a response to the voice query.

5. The method of claim 4 wherein said scoring further comprises:
    performing by the electronic device, a coarse search of the statistical latent lattice model with the plurality of uniterms and the one or more best paths to generate a plurality of coarse search candidates; and
    performing, by the electronic device, a fine search on the coarse search candidates, which fine search involves comparison of the coarse search candidates against the phoneme lattice generated from the voice query to generate a fine search output from among the coarse search candidates.

6. The method of claim 5:
    wherein performing the coarse search further comprises:
        retrieving, by the electronic device, a uniterm phoneme tree from a uniterm index database, wherein the uniterm phoneme tree is a tree that includes substantially all the uniterms discovered from the audio database;
        scoring, by the electronic device, the uniterms of the uniterm phoneme tree against the statistical latent lattice model, wherein a statistical probability of a match of the uniterms and branches of the uniterm phoneme tree to the latent lattice model is provided;
        evaluating, by the electronic device, a resulting score to determine which branches of the uniterm phoneme tree are the top branches, having one of a highest score relative to other branches and a score above a pre-set minimum score; and
        identifying, by the electronic device, the top branches as a result of the coarse search, representing coarse search candidates for utilization as inputs for performing the fine search; and
    wherein performing the fine search further comprises:

matching, by the electronic device, the top branches resulting from the coarse search against the one or more second phoneme lattices of the voice query; and outputting, by the electronic device, a top set of audio segments resulting from the fine search as the response to the voice query.

7. The method of claim 1 wherein the audio tag is a voice identifier.

8. A device comprising:

a processor;

an audio input device for receiving audio data including audio tags and voice queries;

a storage mechanism for storing content and corresponding audio tags;

an output mechanism for outputting stored content based on a search of tags associated with the content; and a voice search and content ordering (VSCO) utility executing on the processor and having logic for completing the following functions:

storing content, wherein said content includes one or more of text, images, audio, videos, and multimedia content;

tagging the content with an audio tag;

receiving a voice query to retrieve content stored on the device;

triggering completion of a voice-to-voice search utilizing uniterms of the audio tag and a phoneme latent lattice model generated from the voice query to identify audio tags tagged to stored content, which audio tags provide one or more uniterms that score within the phoneme lattice model; and outputting retrieved content associated with the identified audio tags having uniterms that score within the phoneme lattice model, wherein the retrieved content is outputted in an order corresponding to an order in which the uniterms are structured within the voice query;

wherein said logic of the VSCO utility for triggering completion of a voice-to-voice search further comprises functional logic for performing the functions of:

generating one or more first phoneme lattices from audio tags;

determining one or more best paths from the one or more first phoneme lattices;

extracting one or more uniterms from the one or more first phoneme lattices;

storing the one or more uniterms and the one or more best paths in a uniterm index database; and re-associating the one or more uniterms with corresponding, stored content with the associated audio tag from which the uniterm was generated; and wherein said logic for extracting one or more uniterms comprises logic for performing the functions of:

generating a next latent statistical lattice model from the one or more phoneme lattices generated from the audio tags;

extracting phoneme strings with a length that is at least equal to a pre-set minimum length from the phoneme lattices as the one or more best paths;

scoring the one or more best paths against the next latent statistical lattice model; and identifying a preset number of best strings as the uniterms selected to represent the phoneme lattice.

9. The device of claim 8 further comprising:

a uniterm discovery and search (UDS) engine executing on the processor and having functional logic for completing the following functions:

generating one or more first phoneme lattices from audio data stored within an audio database;

determining one or more best paths from the one or more first phoneme lattices;

extracting one or more uniterms from the one or more first phoneme lattices; and storing the one or more uniterms and the one or more best paths in a uniterm index database;

wherein said triggering activates the UDS engine to complete the voice-to-voice search.

10. The device of claim 9 wherein said functional logic for generating further comprises logic for performing the functions of:

forwarding the voice query to a speech recognizer, which speech recognizer evaluates received audio and generates one or more phoneme lattices from the received audio; and generating the phoneme lattice from the received audio;

wherein the statistical latent lattice model represents an application of a series of statistical probabilities to the phoneme lattice.

11. The device of claim 8 wherein said functional logic for completing further comprises logic for performing the functions of:

generating a latent statistical lattice model from one or more second phoneme lattices generated from the voice query;

scoring a plurality of uniterms from the first phoneme lattices against the latent statistical lattice model to determine a set of best scoring uniterms; and retrieving content associated with the set of best scoring uniterms as a response to the voice query.

12. The device of claim 11 wherein the functional logic for scoring comprises logic for performing the functions of:

performing a coarse search of the statistical latent lattice model with the plurality of uniterms and the one or more best paths to generate a plurality of coarse search candidates; and performing a fine search on the coarse search candidates, which fine search involves comparison of the coarse search candidates against the phoneme lattice generated from the voice query to generate a fine search output from among the coarse search candidates.

13. The device of claim 12:

wherein the functional logic for performing the coarse search further comprises logic for:

retrieving a uniterm phoneme tree from a uniterm index database, wherein the uniterm phoneme tree is a tree that includes substantially all the uniterms discovered from the audio database;

scoring the uniterms of the uniterm phoneme tree against the statistical latent lattice model, wherein a statistical probability of a match of the uniterms and branches of the uniterm phoneme tree to the latent lattice model is provided;

evaluating a resulting score to determine which branches of the uniterm phoneme tree are the top branches, having one of a highest score relative to other branches and a score above a pre-set minimum score; and identifying the top branches as a result of the coarse search, representing coarse search candidates for utilization as inputs for performing the fine search; and wherein the functional logic for performing the fine search further comprises logic for:

matching the top branches resulting from the coarse search against the one or more second phoneme lattices of the voice query; and outputting a top set of audio segments resulting from the fine search as the response to the voice query.

14. The device of claim 8 wherein the audio tag is a voice identifier and the device is a mobile communication device.

* * * * *